US011226609B2

(12) United States Patent
Saitou

(10) Patent No.: US 11,226,609 B2
(45) Date of Patent: Jan. 18, 2022

(54) NUMERICAL CONTROLLER

(71) Applicant: Fanuc Corporation, Yamanashi (JP)

(72) Inventor: Manabu Saitou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/015,700

(22) Filed: Jun. 22, 2018

(65) Prior Publication Data
US 2019/0004500 A1 Jan. 3, 2019

(30) Foreign Application Priority Data

Jun. 30, 2017 (JP) .............................. JP2017-129591

(51) Int. Cl.
*G05B 19/4155* (2006.01)
(52) U.S. Cl.
CPC ............... *G05B 19/4155* (2013.01); *G05B 2219/32128* (2013.01); *G05B 2219/34216* (2013.01)
(58) Field of Classification Search
None
See application file for complete search history.

(56) References Cited

U.S. PATENT DOCUMENTS

| 3,739,157 | A | * | 6/1973 | Bobrowicz | G05B 19/195 |
| | | | | | 700/86 |
| 4,835,700 | A | * | 5/1989 | Tanaka | G05B 19/40937 |
| | | | | | 700/181 |
| 5,079,713 | A | * | 1/1992 | Kawamura | G05B 19/4061 |
| | | | | | 700/178 |
| 5,270,918 | A | * | 12/1993 | Seki | G05B 19/4093 |
| | | | | | 700/86 |
| 6,290,403 | B1 | * | 9/2001 | Onishi | G05B 19/0426 |
| | | | | | 712/200 |
| 2004/0138776 | A1 | | 7/2004 | Baumann et al. | |

(Continued)

FOREIGN PATENT DOCUMENTS

| CN | 1970281 A | 5/2007 |
| CN | 102221827 A | 10/2011 |

(Continued)

OTHER PUBLICATIONS

Notice of Reasons for Refusal for Japanese Application No. 2017-129591, dated Feb. 16, 2019, with translation, 6 pages.

(Continued)

*Primary Examiner* — Jason Lin
(74) *Attorney, Agent, or Firm* — RatnerPrestia

(57) ABSTRACT

A numerical controller capable of setting the execution order among the commands of an NC program executes at least one NC program to control a plurality of paths. The NC program includes an order setting command by which the execution order can be set among commands for controlling each of the plurality of paths. The numerical controller includes at least one command analysis unit that reads and interprets a command included in the NC program, and when execution order of the command is set by the order setting command, outputs command data to which the execution order is added, and at least one command executor that executes command processing of each path in accordance with the execution order based on the command data that is output by the command analysis unit and to which the execution order is added.

1 Claim, 10 Drawing Sheets

(56) References Cited

U.S. PATENT DOCUMENTS

| | | | |
|---|---|---|---|
| 2006/0058907 A1* | 3/2006 | Suderman | G05B 19/4093 |
| | | | 700/184 |
| 2010/0231157 A1* | 9/2010 | Haga | G05B 19/4093 |
| | | | 318/570 |
| 2011/0190915 A1* | 8/2011 | Fujishima | G05B 19/4067 |
| | | | 700/97 |
| 2011/0257781 A1 | 10/2011 | Maeda et al. | |
| 2013/0006391 A1 | 1/2013 | Kito et al. | |
| 2014/0085455 A1 | 3/2014 | Kubo et al. | |
| 2014/0088755 A1 | 3/2014 | Haga et al. | |
| 2015/0039122 A1* | 2/2015 | Barakchi Fard | G06F 17/5009 |
| | | | 700/186 |
| 2015/0338845 A1 | 11/2015 | Haga et al. | |

FOREIGN PATENT DOCUMENTS

| | | | |
|---|---|---|---|
| CN | 102854831 A | | 1/2013 |
| CN | 103676772 A | | 3/2014 |
| CN | 103676784 A | | 3/2014 |
| CN | 104076736 A | * | 10/2014 |
| CN | 104076736 A | | 10/2014 |
| CN | 104937510 A | | 9/2015 |
| CN | 105094054 A | | 11/2015 |
| CN | 105556405 A | | 5/2016 |
| DE | 112014000400 T5 | | 9/2015 |
| EP | 0409988 A1 | | 1/1991 |
| JP | S6381509 A | | 4/1988 |
| JP | H01226004 A | | 9/1989 |
| JP | 1-295741 A | | 11/1989 |
| JP | H0239302 A | | 2/1990 |
| JP | H03196306 A | | 8/1991 |
| JP | H06314109 A | | 11/1994 |
| JP | H1049216 A | | 2/1998 |
| JP | 2003288107 A | | 10/2003 |
| JP | 2010157095 A | | 7/2010 |
| JP | 6105016 B1 | | 3/2017 |

OTHER PUBLICATIONS

Chinese Office Action for Chinese Application No. 201810701516.7, dated Feb. 26, 2020, 5 pages.

Chinese Office Action for Chinese Application No. 201810701516.7, dated May 25, 2020 with translation, 16 pages.

German Office Action for German Application No. 10 2018 005 007.7, dated Aug. 13, 2020 with translation, 8 pages.

* cited by examiner

EXAMPLE OF TWO-PATH PROGRAM

```
O1001
N10 ...
N20 G01X100.Y100.;
N30 M100P3J2;
N40 G01X50.;
N50 ...
...
M30
```
ORDER 2

```
O2001
N10 ...
N20 G01Z50.;
N30 M100P3J1;
N40 G01Z50.;
N50 ...
...
M30
```
ORDER 1

FIG.5
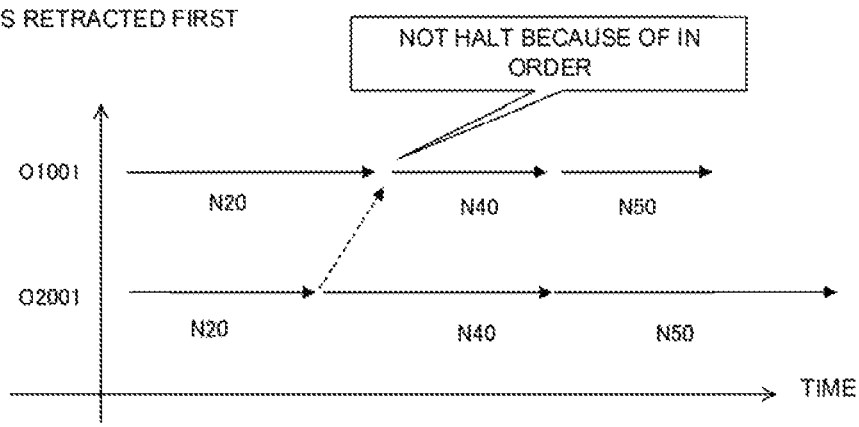
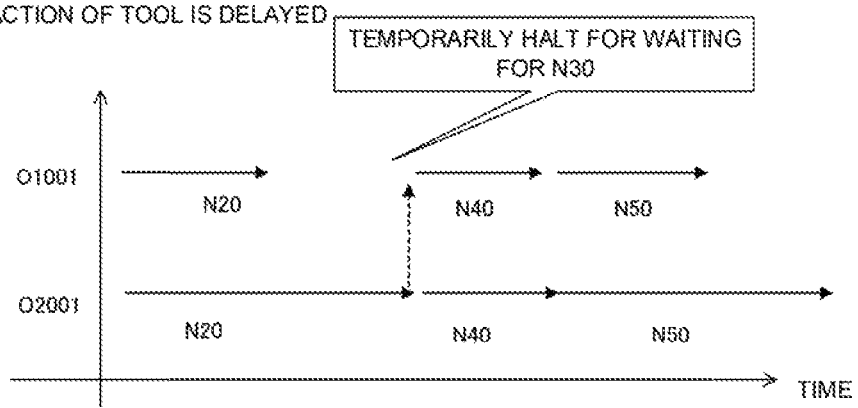

FIG.7
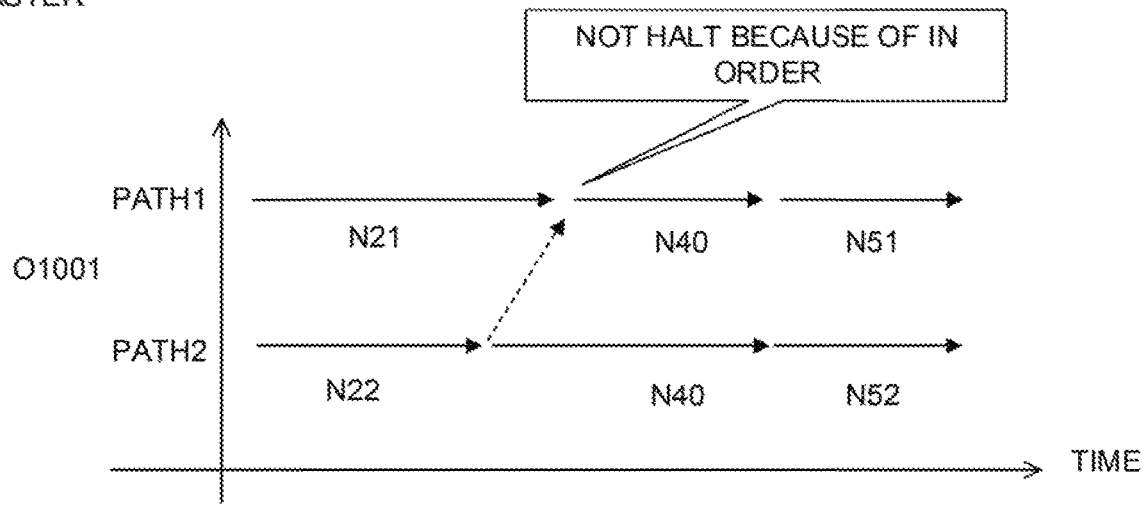
· CASE WHERE EXECUTION OF PATH 2 IS FASTER
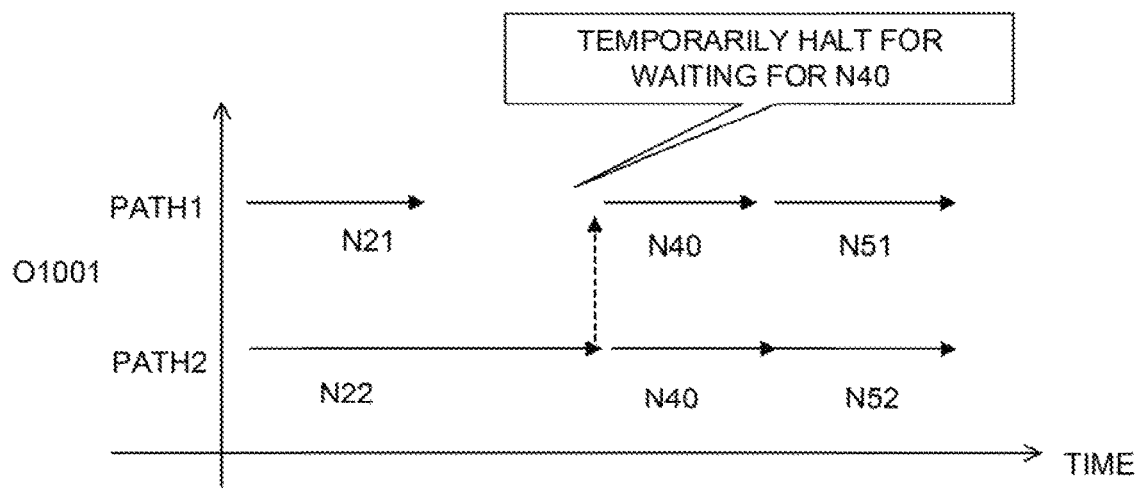
· CASE WHERE PATH 2 IS DELAYED

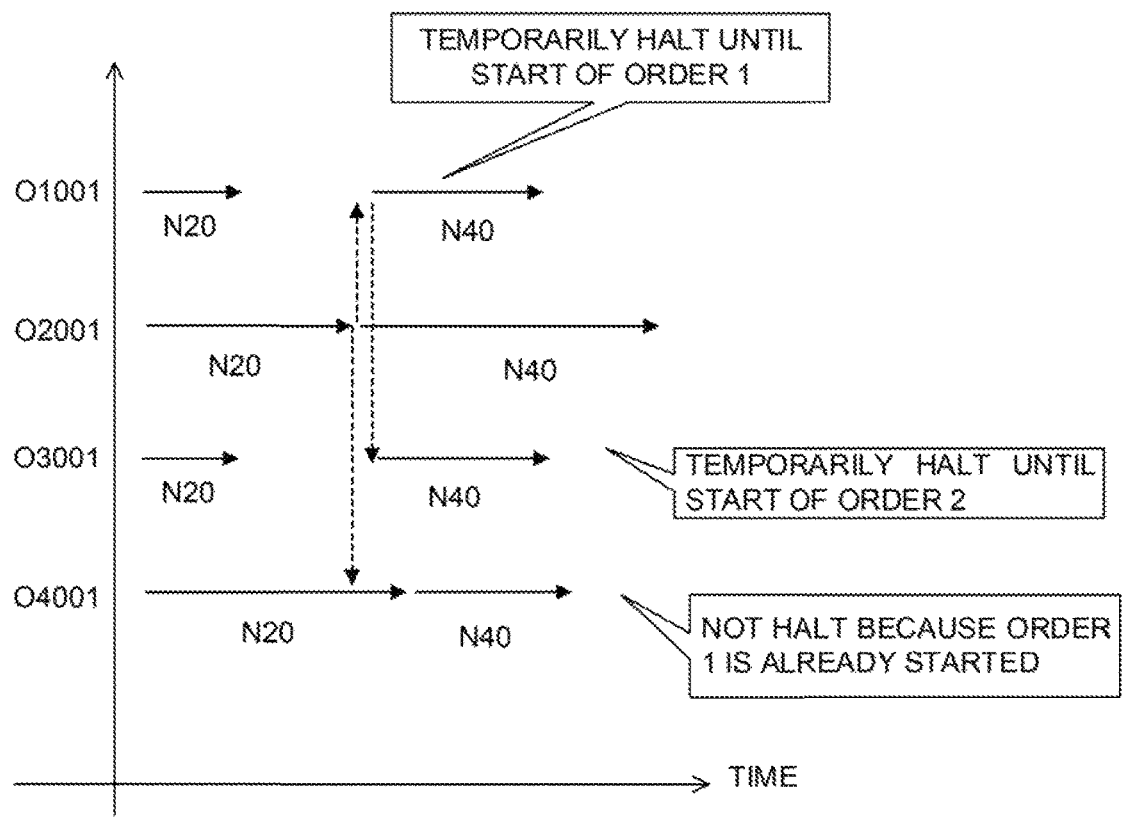

NUMERICAL CONTROLLER

CROSS-REFERENCE TO RELATED APPLICATION

This application is a new U.S. Patent Application that claims benefit of Japanese Patent Application No. 2017-129591, filed Jun. 30, 2017, the disclosure of this application is being incorporated herein by reference in its entirety for all purposes.

BACKGROUND OF THE INVENTION

1. Field of the Invention

The present Invention, relates to a numerical controller, and snore particularly to a numerical controller capable of setting an order of commands.

2. Description of the Related Art

A multi-path program used for control of a machine tool in a numerical controller is capable of synchronizing paths by applying a queuing command. This is an effective command for a case where there are blocks for which it is desired that machining is started simultaneously between paths, a route calculation is required after queuing, or the like. As shown in FIG. 11, in conventional queuing processing between paths, with a queuing command embedded in advance in an NC program of each path to be queued, when the queuing command is detected in program interpreting processing, the NC program interpreting processing of a path thus detected is temporarily halted. Thereafter, the processing is resumed at the time when the queuing command of another path that has been designated is reached (for example, JP H01-295741 A).

In recent years, as process consolidation progresses, it is required that one control device execute not only machining of a workpiece, but also handling and measuring of the workpiece, and the like. In the control of handling and measuring of the workpiece, synchronism with other paths is not often required, but it is required that the control be executed in parallel with the other paths while maintaining the order relation of processing as set.

For example, as shown in FIG. 12, in a case where the workpiece is transported after cutting processing, a retraction action A of a tool can be started without waiting for the start of a transport operation B of a transport device, while on the other hand, even if the transport device starts the transport operation B any time after the retraction action A of the tool is started, the tool and the workpiece do not interfere with each other. Furthermore, as shown in FIG. 13, in a case where the transport operation B of the transport device is slower than the retraction action A of the tool and the retraction action A of the cool is already started at the end of a block b-1 of the transport operation B, there is no problem even if the transport operation B is executed with the block b-1 and a block b-2 overlapping with each other without waiting at the end of the block b-1.

The use of the conventional technique requires the queuing command to be added to the NC program in order to prevent interference between the paths. However, the use of the queuing command causes both the tool and the transport device to be stopped for a moment in a queuing block, which results in a problem in that the cycle time is made longer. In a case where only one of the paths needs to wait for the operation of the other path so as to prevent mutual interference, as described in FIGS. 12 and 13, it is not necessary to execute the queuing processing by which both the paths are synchronized with each other.

In order to solve such a problem, conventionally, the elimination of redundancies is achieved by monitoring machine coordinates by using a ladder program or the like and determining a situation to activate an interlock or to prevent the start processing of the control command (single block stop). However, combining the processing of the NC program and the processing of the ladder program that are being executed in parallel makes it necessary for each program to wait for the processing result of the partner's program, causing another problem in that a decrease in responsiveness occurs.

SUMMARY OF THE INVENTION

It is therefore an object of the present invention to provide a numerical controller capable of setting an execution order between commands of an KC program.

According to the present invention, the above problem is solved by providing a unit that sets the execution order relation between the queuing commands in the NC programs of different paths. For example, in a case where the execution order relation is set between respective commands of two paths, the numerical controller of the present invention sets a block A (command A) in the NC program of a path 1 to the first place and sets a block B (command B) in the NC program of a path 2 to the second place. With such a setting made, in a case where the command B is started after the start of the command A at the execution of the NC program, the numerical controller of the present invention does not execute the queuing processing on either the command A or the command B. In a case where the command B is started before the start of the command A, the numerical controller executes control so as to suspend the start processing of the command B to wait for the start of execution of the command A.

The setting of the order relation according to the present invention is not limited to the start timing of a plurality of blocks, and the order relation may be set between the end of the execution of the command A set to the first place and the start of the execution of the command B set to the second place. Furthermore, in the setting of the order relation according to the present invention, the order among respective commands of three or more paths cans be set by using sequential numbers such as 1 to 2 to 3.

A numerical controller of one aspect of the present invention executes at least one NC program to control a plurality of paths, the NC program including an order setting command by which execution order can be set among commands for controlling each of the plurality of paths. The numerical controller includes at least one command interpreter that reads and interprets a command included in the NC program, and when execution order of the command is set by the order setting command, outputs command data to which the execution order is added, and at least one command executor that executes command processing of each path in accordance with to the execution order based on the command data that is output by the command interpreter and to which the execution order is added.

According to the present invention, a plurality of paths can be controlled in parallel while the order relation of processing is maintained as set without requiring an author of the NC program to input complicated control, which eliminates extra queuing or a temporary halt and thus makes it possible to improve the cycle time of machining without a decrease in responsiveness of the program processing.

BRIEF DESCRIPTION OF THE DRAWINGS

The foregoing and other objects and features of the present invention will become apparent from the following description of examples with reference to the accompanying drawings. Of those drawings:

FIG. 5 is a diagram showing a time chart at the time of execution order setting between two paths;

FIG. 7 is a diagram showing a time chart at the time of execution order setting in a case where two paths are controlled by one program;

FIG. 9 is a diagram showing a time chart at the time of execution order setting among multiple paths;

FIG. 11 is a diagram showing an example of queuing processing between paths according to a conventional technique;

DETAILED DESCRIPTION OF THE PREFERRED EMBODIMENTS

A configuration example of a numerical controller for realizing the present invention will be described below.

Figure 1:
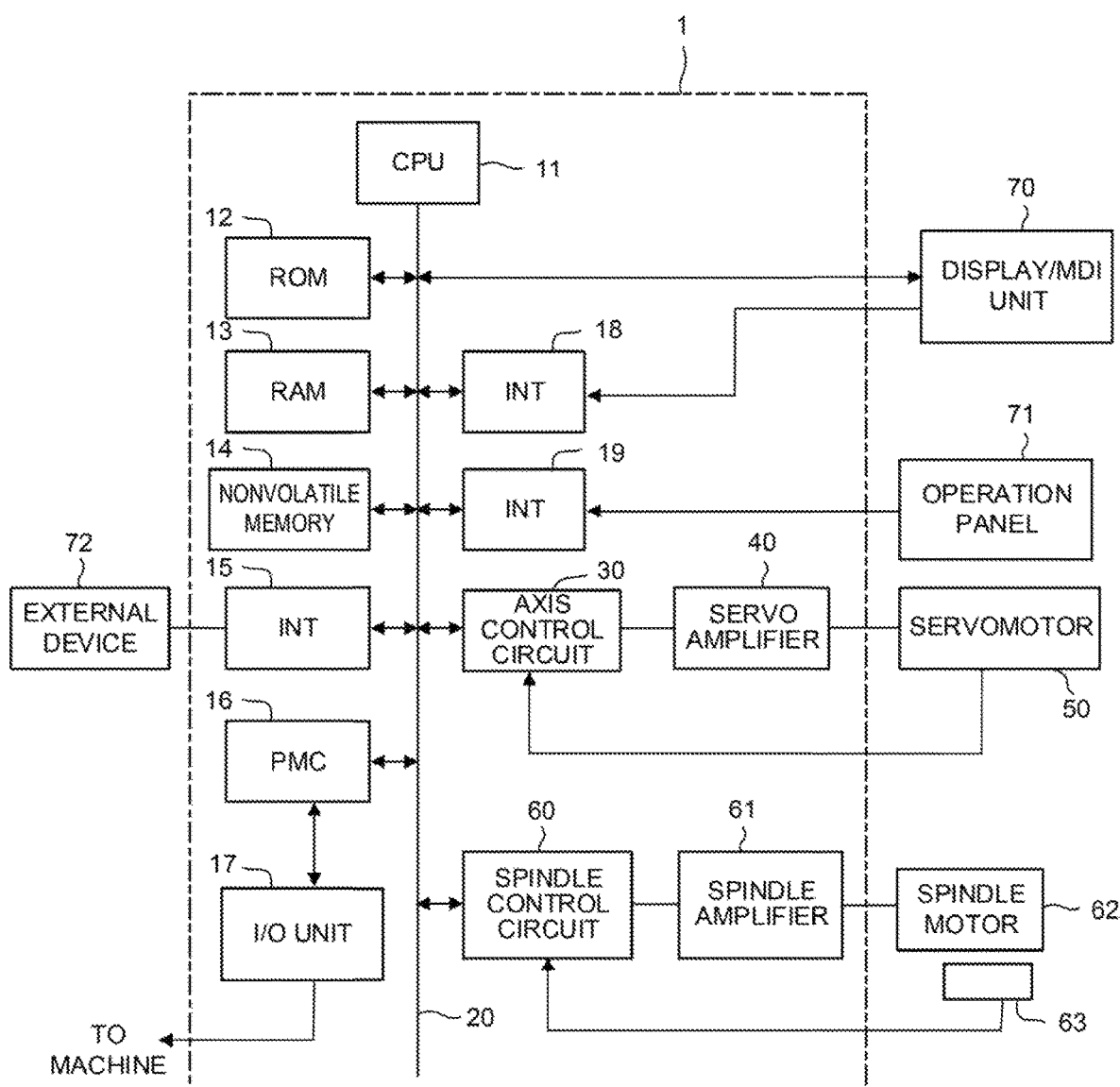
FIG. 1 is a schematic hardware configuration diagram showing a numerical controller according to a first embodiment and a main part of a machining device driven and controlled by the numerical controller.

FIG. 1 is a schematic hardware configuration diagram shewing a numerical controller according to a first embodiment of the present invention and a main part of a machining device driven and controlled by the numerical controller. A CPU 11 included in a numerical controller 1 according to the present embodiment is a processor that executes overall control of the numerical controller 1.

The CPU 11 reads a system program stored in a ROM 12 via a bus 20 and executes the overall control of the numerical controller 1 in accordance with the system program. A RAM 13 stores, for example, temporary calculation data, display data, and various types of data input by an operator via a display/manual data input (MDI) unit 70 (to be described below).

A nonvolatile memory 14 serves as a memory that keeps data due to, for example, backup by a battery (not shown) even when power supply to the numerical controller 1 is off. In addition to an NC program that is read via an interface 15 or input via the display/MDI unit 70 (to be described below), tool data including a recommended value of a cutting condition of a tool used for machining and the like are stored in the nonvolatile memory 14. An NC program operation processing program used for operating the NC program and the like are further stored in the nonvolatile memory 14, and these programs are loaded in the RAM 13 at the time of execution. Furthermore, various system programs for executing, for example, processing in an edit mode required for creating and editing the NC program (including a system program of a command execution order setting function) are pre-stored in the ROM 12.

The interface 15 is an interface for connecting the numerical controller 1 and an external device 72 such as an adapter. From the external device 72, the NC program, various parameters, and the like are read. Furthermore, an NC program edited in the numerical controller 1 can be stored in an external storage unit via the external device 72. A programmable machine controller (PMC) 16 outputs a signal to a peripheral device (for example, an actuator such as a robot hand for tool change) of a machining device via an I/O unit 17 to control the peripheral device in accordance with a sequence program stored in the numerical controller 1. Furthermore, PMC 16 receives signals from various switches and the like or an operation panes provided in a main body of the machining device, executes necessary signal processing on the signals, and passes the signals thus processed to the CPU 11.

The display/MDI unit 70 is a manual data input device including a display, a keyboard, and the like. An interface 18 receives a command and data from the keyboard of the display/MDI unit 70 and passes the command and data to the CPU 11. An interface 19 is connected to an operation panel 71 including, for example, a manual pulse generator used for manually driving each axis.

An axis control circuit 30 for controlling an axis of the machining device receives a movement command amount for an axis from the CPU 11 and outputs a command for the axis to a servo amplifier 40. In response to this command, the servo amplifier 40 drives a servomotor 50 to move the axis of the machining device. The servomotor 50 for the axis includes a position and speed detector and feeds a position and speed feedback signal from the position and speed detector back to the axis control circuit 30 to execute position and speed feedback control. Note that, in the hardware configuration diagram of FIG. 1, only one axis control, circuit 30, servo amplifier 40, and servomotor 50 are shown, but a plurality of axis control circuits 30, servo amplifiers 40, and servomotor 50 are actually provided in proportion to the number of axes to be controlled.

A spindle control circuit 60 receives a main axis rotation command directed to the machining device and outputs a spindle speed signal to a spindle amplifier 61. In response to this spindle speed signal, the spindle amplifier 61 rotates a spindle motor 62 of the machining device at a rotation speed specified by the command to drive the tool.

A position coder 63 is coupled to the spindle motor 62 and outputs a feedback pulse in synchronism with the rotation of the main axis, and the feedback pulse is read by the CPU 11.

Figure 2:
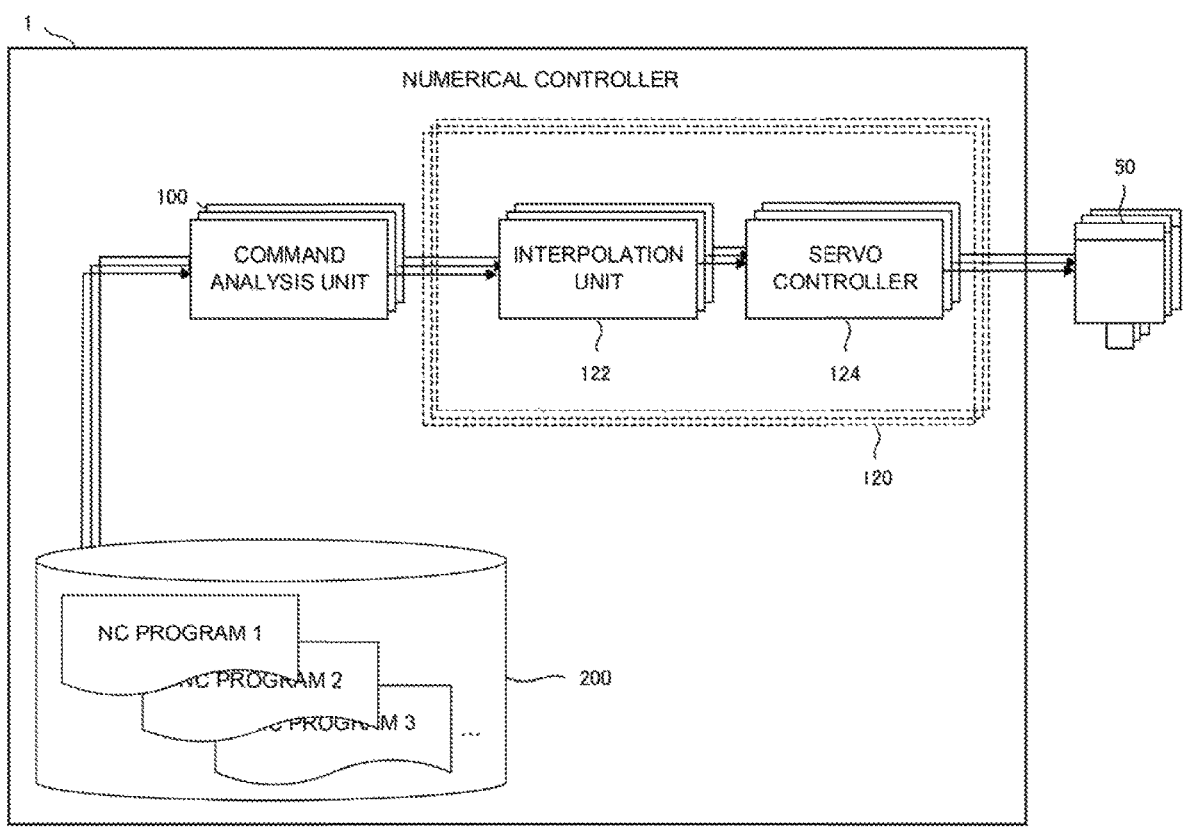
FIG. 2 is a schematic function block diagram of the numerical controller according to the first embodiment.

FIG. 2 is a schematic function block diagram showing a main part of the numerical controller according to the first embodiment of the present invention in a case where a system program for realizing the execution order setting function of the present invention is implemented in the numerical controller 1 shown in FIG. 1. Each of the function blocks shown in FIG. 2 is realized by the CPU 11 included in the numerical controller 1 shown in FIG. 1, the CPU 11 being configured to execute the system program of the execution order setting function and control the operation of each unit of the numerical controller 1. The numerical controller 1 of the present embodiment includes a command interpreter 100, a command executor 120, an interpolation unit 122, and a servo controller 124. In the numerical controller 1 of the present embodiment, the command interpreter 100, the command executor 120, and the interpolation unit 122 are provided for each path, and the servo controller 124 is provided for each servomotor 50 that drives an axis to be controlled. Furthermore, an NC program storage area 200 for storing the NC program is allocated in the nonvolatile memory 14, and the NC program for controlling each path is pre-stored in the NC program storage area 200.

Notes that one NC program stored in the NC program storage area 200 may be provided, for each path. Alternatively, one NC program may include commands for controlling a plurality of paths, which causes command analysis units 100 to be provided as many as the number of NC programs to be simultaneously executed.

The command analysis unit 100 sequentially reads command blocks included in the NC program from the NC program storage area 200, interprets the command block thus read, and creates command data. The command data created by the command analysis unit 100 includes, for example, movement command data used for controlling an axis of each path to be controlled. In a case where the block read from the NC program includes an order setting command for setting execution order of commands, the command analysis unit 100 creates command data including the execution order set by the order setting command. The execution order added to the command data by the command analysis unit 100 can be denoted as a label (1, 2, 3, and so an) based on which a predetermined order can be identified. Furthermore, the execution order added to the command data by the command analysis unit 100 may be denoted as a label (1A, 2A, 3A, and so on, and 1B, 2B, 3B, and so on) based on which sets of commands for setting the execution order can be distinguished from each other and a predetermined order of each of the sets of commands can be identified, which allows the execution order of a plurality of sets of commands to be set in the NC program. The command analysis unit 100 outputs the command data thus created to the command executor 120 provided for each path.

The command executor 120 is a function unit that controls execution of the command data received from the command analysis unit 100 in accordance with timing determined based on the execution order. For example, in a case where the command data includes the movement command data, the command executor 120 passes the movement command data to the interpolation unit 122. The command executor 120 may store, in a queue, the command data received from the command analysis unit 100 and pass the command data at the head of the queue to the interpolation unit 122, for example.

In this case, command data for which the command execution order is not set, the command executor 120 passes the command data to the interpolation unit 122 without checking the execution order. In contrast, command data for which the command execution order is set, the command executor 120 checks the execution order of the command data in cooperation with command executors 120 of other paths and, when the command data needs to toe executed next, passes the command data to the interpolation unit 122. A method of checking the execution order executed by the command executor 120 includes, for example, a method using a shared counter shared among the command executors 120 of the respective paths, and a method of notifying the command executors 120 of other paths of a label value corresponding to the execution order of the command data, whose execution has been started, through interprocess communication among the command executors 120 of the respective paths (and causing the command executors 120 to store the label value corresponding to the execution order of the command data whose execution has already started). However, any method may be used as long as the command data can be passed in accordance with the set execution order. Note that, in a case where the label (A1, A2, A3, and so on, and B1, B2, B3, and so on) based on which a plurality of sets of commands can be distinguished from each other and a predetermined order of each of the sets of commands can be identified is used, the method may be implemented, for example, with a shared counter provided for each of the plurality of sets of commands so that a plurality of sets of order labels can be handled.

The interpolation unit 122 divides a command path specified by (the movement command data included in) the command data passed from the command executor 120 into paths having movement distances corresponding to interpolation intervals to generate interpolation data.

Based on the interpolation data generated by the interpolation unit 122, the servo controller 124 controls the servomotor 50 that drives an axis to be controlled.

Figure 3:
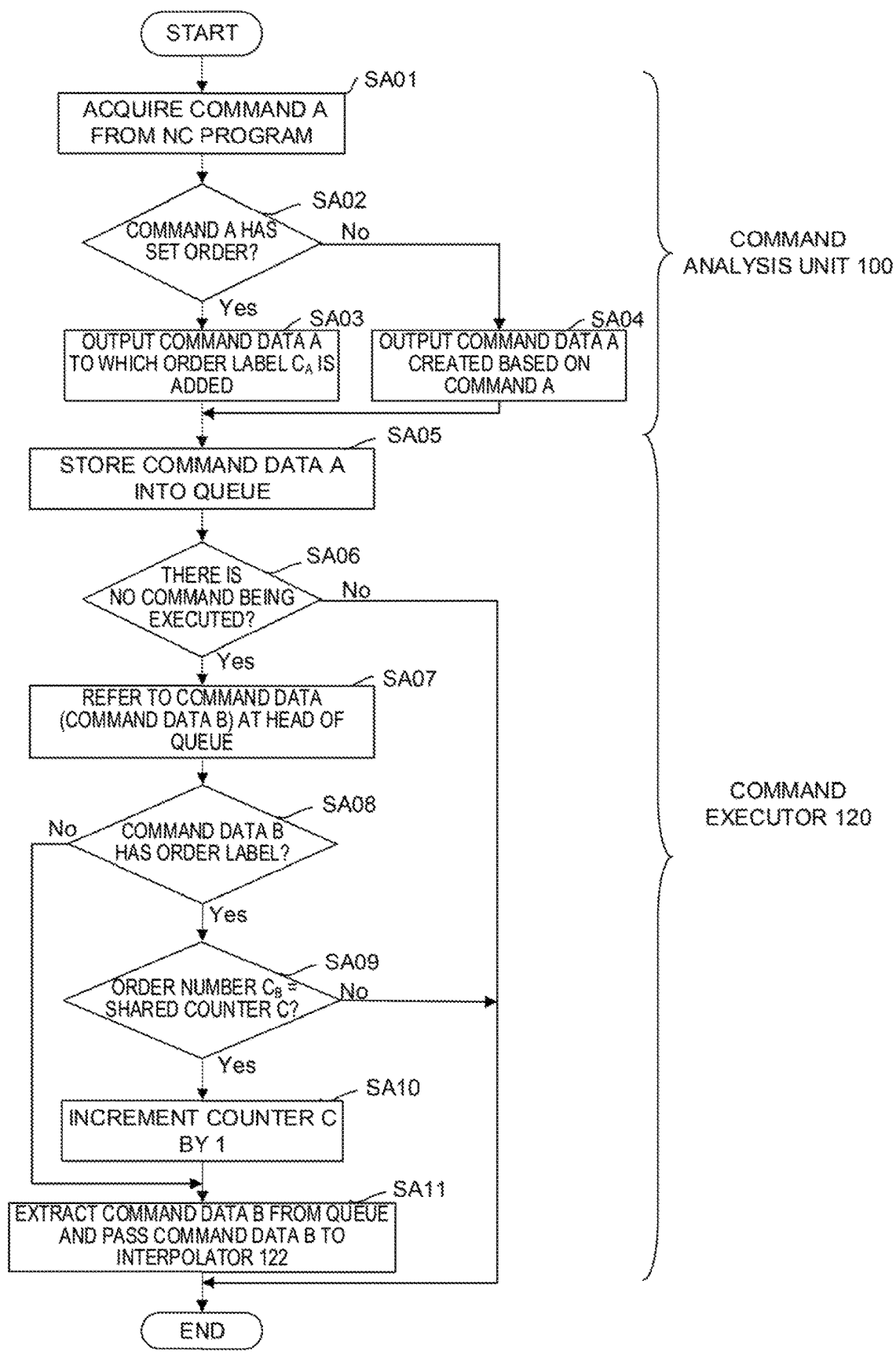
FIG. 3 is a schematic flow chart of execution order setting processing executed by the numerical controller according to the first embodiment.

FIG. 3 is a flowchart showing an example of a processing operation for each control cycle or the command analysis unit 100 and the command executor 120 in a case where a counter is used for check of the execution order. In the example shown in FIG. 3, the command executor 120 uses a queue for managing the command data, and one shared counter C shared among the command executors 120 of the respective paths is used for check of the execution order among the paths. At the start of processing, the shared counter C is set to, as the initial value, the smallest value among the labels indicating an order (set to 1 if the labels indicating the order are 1, 2, 3, and so on).

[Step SA01] The command analysis unit 100 acquires a command A from the EC program stored in the NC program storage area 200.

[Step SA02] The command analysis unit 100 determines whether the command A acquired in step SA01 has a set order. In a case where the command A has a set order, the process proceeds to step SA03; otherwise, the process proceeds to step SA04.

[Step SA03] The command analysis unit 100 creates command data A to which an order label $C_A$ corresponding to an order label specified in the command A is added, and outputs the command data A to the command executor 120 of the path that executes the command A.

[Step SA04] The command analysis unit 100 creates command data A based on the command A and outputs the command data A to the command executor 120 of the path that executes the command A.

[Step SA05] The command executor 120 stores the command data A in the queue.

[Step SA06] The command executor 120 determines whether there is no command being executed by the interpolation unit 122. In a case where there is no command being executed, the process proceeds to step SA07; otherwise, the process of the current control cycle ends.

[Step SA07] The command executor 120 refers to command data B corresponding to command data at the head of the queue.

[Step SA08] The command executor 120 determines whether the command data B has an order label. In a case where the command data B has an order label, the process proceeds to step SA09; otherwise, the process proceeds to step SA11.

[Step SA09] The command executor 120 determines whether the value of the order number $C_B$ added to the command data B is equal to the value indicated by the shared counter C. In a case where both the values are equal to each other, the process proceeds to step SA10; otherwise, the process of the current control cycle ends.

[Step SA10] The command executor 120 increments the value indicated by the shared counter C by 1.

[Step SA11] The command executor 120 extracts the command data B from the queue and passes the command data B to the interpolation unit 122.

Figure 4:
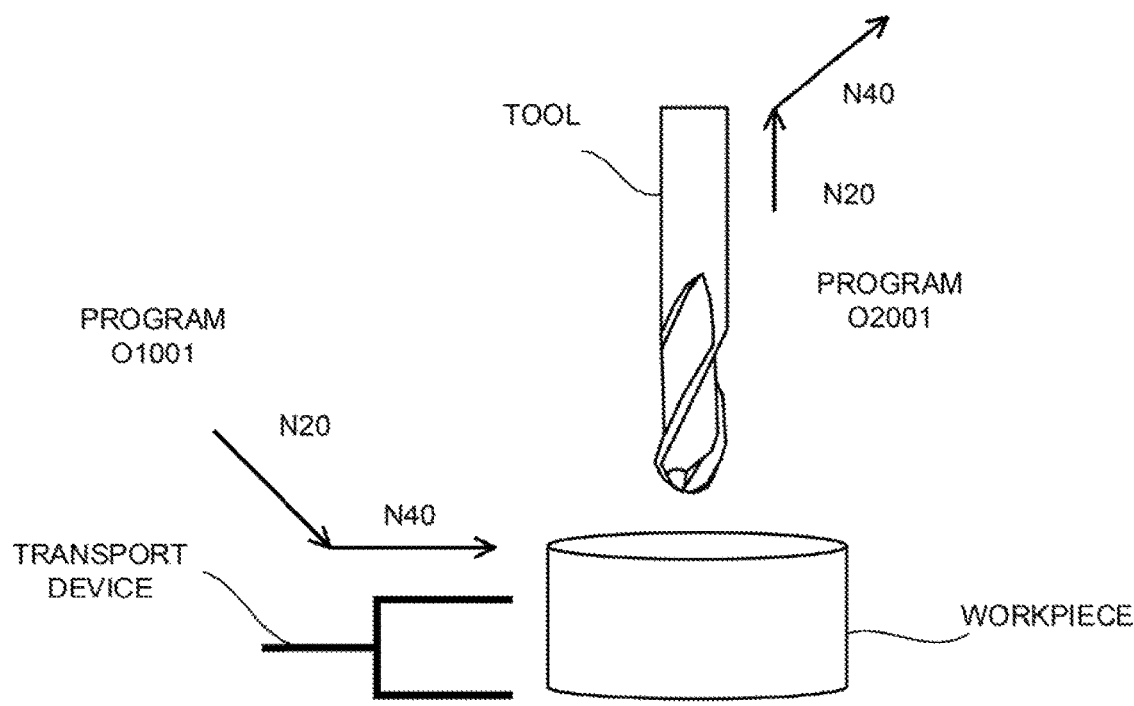
FIG. 4 is a diagram showing an example of execution order setting between two paths.

FIGS. 4 and 5 show an example of the present invention in a case where the execution order is set between programs of two paths.

In FIG. 4, an NC program O1001 is an NC program for controlling a transport device corresponding to a first path, and an NC program O2001 is an NC program for controlling the machining device provided with a tool corresponding to a second path. In the example shown in FIG. 4, an operation of retracting the tool from a workpiece after the workpiece is machined with the tool (blocks N20 to N40 of the NC program O2001) and a subsequent operation of causing the transport device to take out the workpiece (blocks N20 to N40 of the NC program O1001) are defined in the respective NC programs. In the example shown in FIG. 4, a command "M100P3" is an example of an order setting command, and J1, J2, J3, or the like is appended to the command so that the execution order of a command of the next block is set, the J1, J2, J3, or the like corresponding to the order label 1, 2, 3, or the like. An order setting command "M100P3J1" of the KC program O2001 in the example shown in FIG. 4 sets the execution order of the block N40 of the NC program O2001, that is the next block to the first place, and an order setting command "M100P3J2" of the NC program O1001 sets the execution order of the block N40 of the NC program O1001 that is the next block to the second place.

When such an NC program of each path is executed by the numerical controller 1 of the present invention, as shown in the time chart of FIG. 5, in a case where the execution of the block N20 of the NC program O2001 is completed before the execution of the block N20 of the NC program O1001 is completed and then the execution of the block N40 of the NC program O2001 is started (which increments the value of the shared counter C by 1), the value of the shared counter C has already become 2 when the command data of the block N40 of the NC program O1001 reaches the head of the queue of the command executor 120; therefore, the command data is passed as it is to the interpolation unit 122 and executed.

On the other hand, in a case where the execution of the block N20 of the BC program O2001 is not completed yet and the execution of the block N40 of the NC program O2001 is not started yet (which causes the value of the shared counter C to remain as it is, that is, the initial value), the value of the shared counter C is 1 when the command data of the block N40 of the NC program O1001 reaches the head of the queue of the command executor 120; therefore, until the execution of the block N20 of the NC program O2001 is completed and the execution of the block N40 of the NC program O2001 is started, the execution of the command data is not started and is kept waiting.

Figure 6:
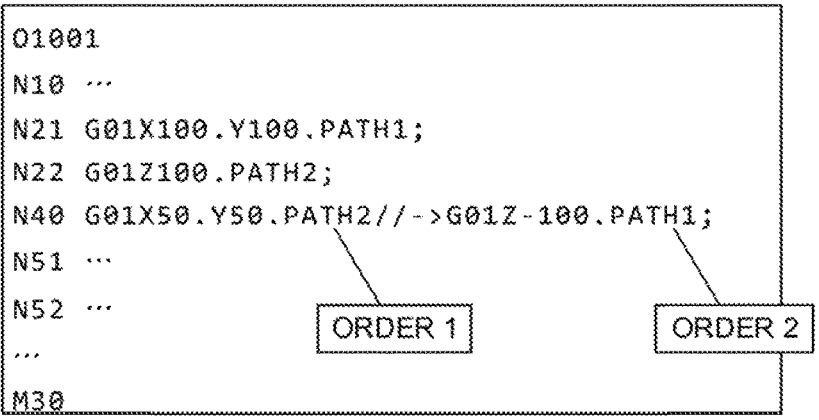
FIG. 6 is a diagram showing an example of execution order setting in a case where two paths are controlled by one program.

FIGS. 6 and 7 show an example of the present invention in which the execution order is set in a case where one program controls two paths.

In FIG. 6, an NC program O1001 is an NC program for controlling both the transport device corresponding to the first path and the machining device provided with the tool corresponding to and the second path, and a block that controls the first path includes a command "PATH 1", and a block that controls the second path includes a command "PATH 2". Furthermore, in the example shown in FIG. 6, an order setting command "//–>" for setting the execution order between commands is introduced, and the use of the order setting command makes it possible to prevent a command described after the order setting command from being started until the command described before the order setting command is started. A plurality of order setting commands "//–>" may be described in one block. For example, in a case where three paths are controlled by one program, three commands for controlling the respective paths are delimited by two order setting commands "//–>", which allows any desired execution order to be set among the commands of the three paths. Note that in a case where all the paths are controlled by one NC program, only one command analysis unit 100 is provided for all the paths as described above, and one command analysis unit 100 creates pieces of command data of all the paths. For example, after reading and interpreting the N40 block shown in FIG. 6, the command analysis unit 100 creates command data with an order label for a path 1 and command data with an order label for a path 2 and outputs the pieces of command data to the command executors 120 of the respective paths.

When such an NC program of each path is executed by the numerical controller 1 of the present invention, as shown in the time chart, of FIG. 7, in a case where the execution of the block N21 is completed before the execution of the block N22 is completed and then the execution of the command of the path 2 of the block N40 (command described on the left side of the order setting command "//–>") is started (which increments the value of the shared counter C by 1), the value of the shared counter C has already become 2 when the command data of the path 1 of the block N40 (command data based on a command "G 01Z-100" described on one right side of the order setting command "//–>") reaches the head of the queue of the command executor 120; therefore, the command data is passed as it is to the interpolation unit 122 and executed.

On the other hand, in a case where the execution of the block N21 is not completed yet and the execution of the command of the path 2 of the block N40 (command described on the left side of the order setting command "//–>") is not started yet (the value of the shared counter C remains as it is, that is, the initial value), the value of the shared counter C is 1 when the command data of the path 1 of the block N40 (command data based on the command "G01Z-100" described on the right side of the order setting command "//–>") reaches the head of the queue of the command executor 120; therefore, until the execution of the block N22 is completed and the command of the path 2 of the block N40 is started, the execution of the command data is not started and is kept waiting.

Figure 8:
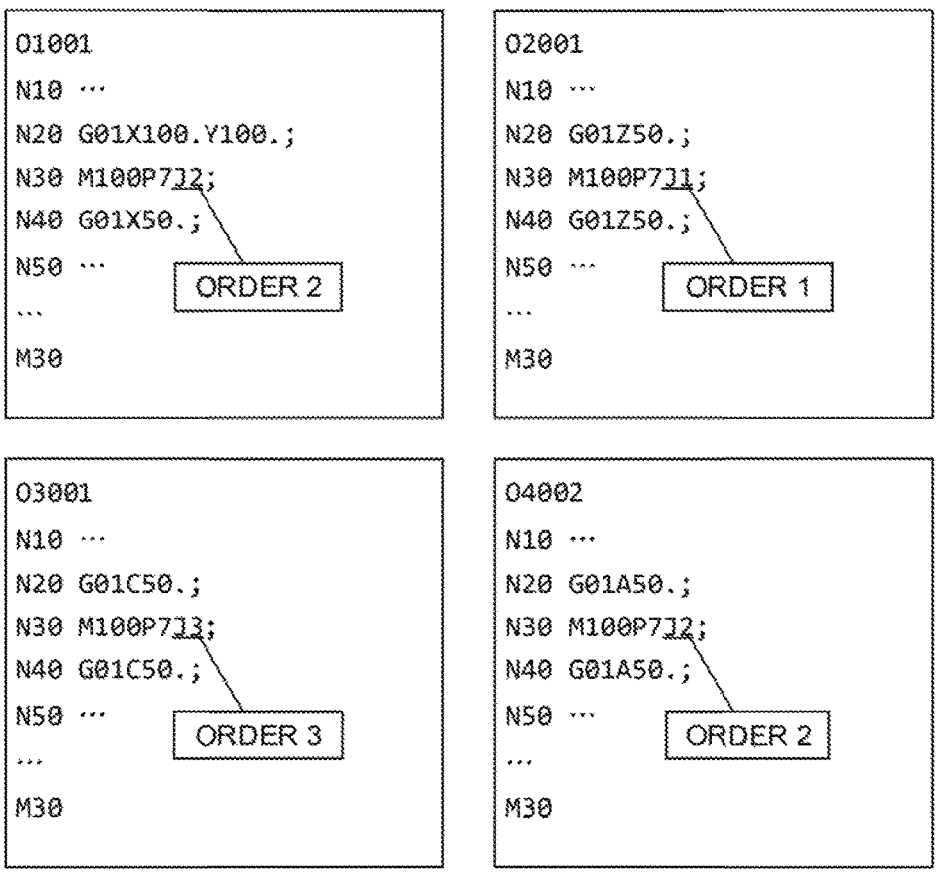
FIG. 8 is a diagram showing an example of execution order setting among multiple paths.

FIGS. 8 and 9 show an example of the present invention in a case where the execution order is set among programs of multiple paths.

In FIG. 8, an NC program O1001, an NC program O2001, an NC program O3001, and an NC program O4001 are NC programs for controlling a first path, a second path, a third path, and a fourth path, respectively, and the execution Order of the command of the block N40 of each NC program is set by an order setting command "M100P3" of the block N30 of each NC program. In the example shown in FIG. 8, execution order 1 is set for the block N40 of the NC program O2001, execution order 2 is set for the block N40 of the NC program O1001 and the block N40 of the NC program O4001, and execution order 3 is set for the block N40 of the NC program O3001. Note that, in this example, in a case where there are a plurality of commands for which the same execution order is set, no order relation is defined between these commands, and after the execution of the command for which the execution order 1 is set, any of the commands for which the execution order 2 is set can be executed.

When such an NC program of each path is executed by the numerical controller 1 of the present invention, as shown in the time chart of FIG. 9, in a case where, at the time when the execution of the block N20 of the NC program O1001 is completed, the execution of the block N40 of the NC program O2001 is not started yet, the execution of the block N40 of the NC program O1001 is kept waiting. On the other hand, in a case where, at the time when the execution of the block N20 of the NC program O4001 is completed, the execution of the block N40 of the NC program O2001 has been started, the execution of the block N40 of the NC program O4001 is executed without waiting. Furthermore, the execution of the block N40 of the NC program O3001 is kept waiting until the execution of the block N40 of the NC program O1001, the execution of the block N40 of the NC program O2001, and the execution of the block N40 of the NC program O4001 are started.

Thus, in the numerical controller 1 of the present invention having the above-described configuration, adding a brief description to the NC program makes it possible to set the execution order among the commands of the NC program that controls each path. The use of the numerical controller 1 of the present invention eliminates the need for monitoring machine coordinates by using a ladder program or the like and determining a situation to activate an interlock or to prevent the start processing of the control command (single block stop), which makes it possible to set the execution order without a decrease in responsiveness in program execution.

Figure 10:
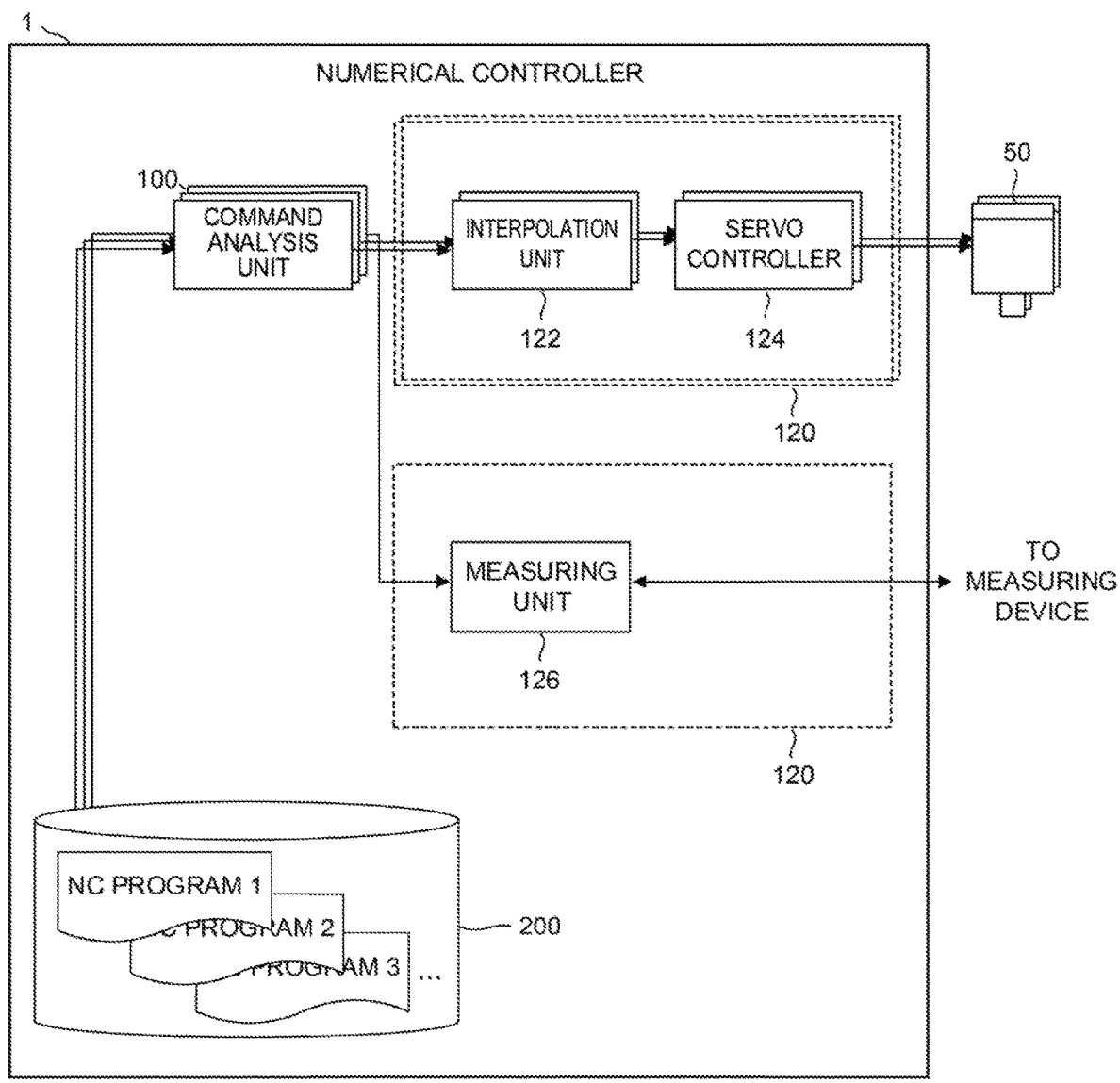
FIG. 10 is a schematic function block diagram of a numerical controller according so a second embodiment.
Figure 12:
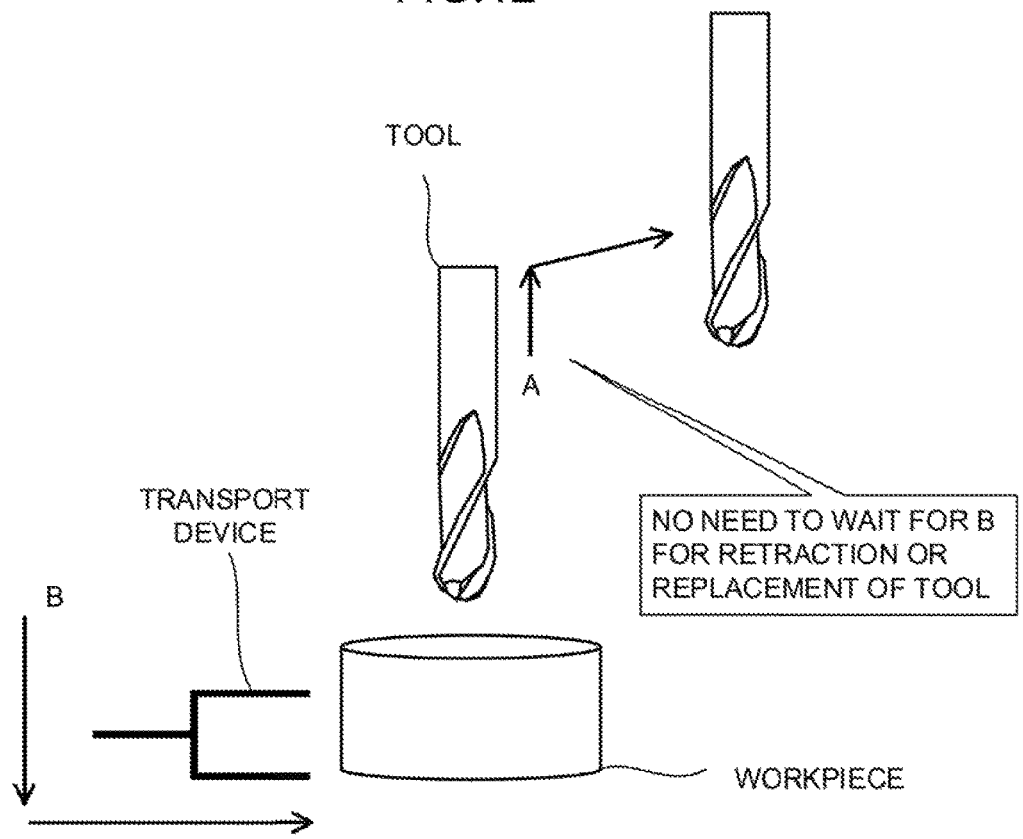
FIG. 12 is a diagram for explaining a problem of the queuing processing between paths according to the conventional technique.
Figure 13:
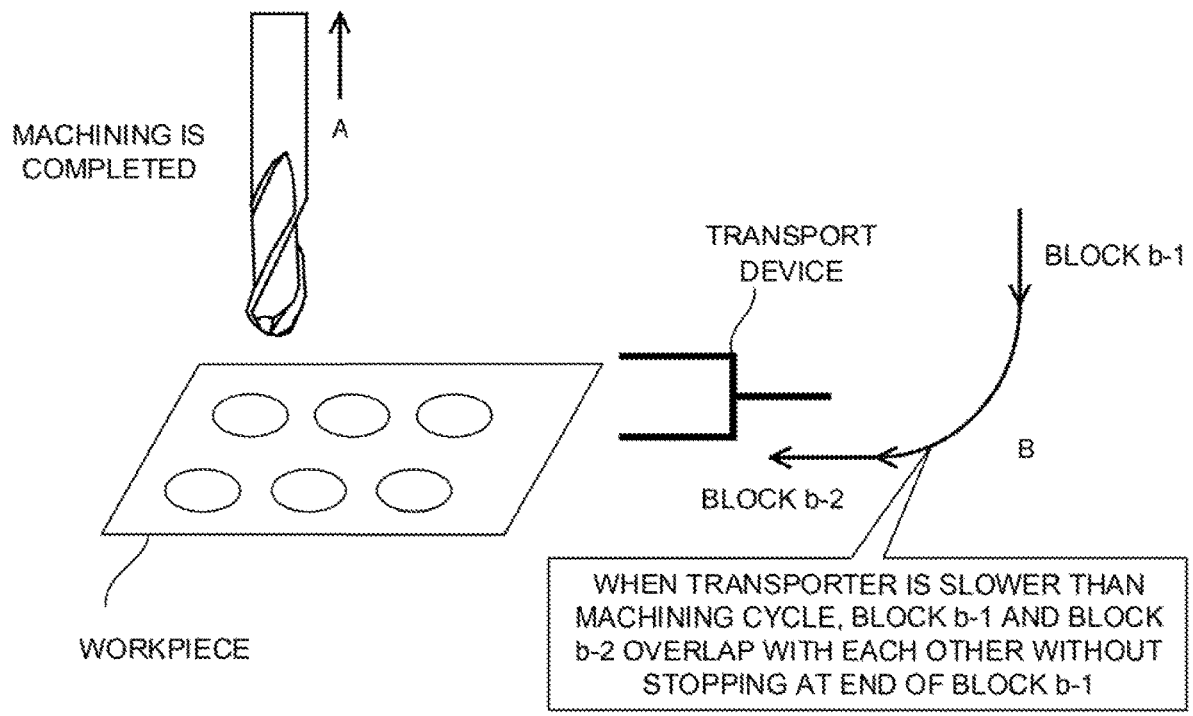
FIG. 13 is a diagram for explaining another problem of the queuing processing between paths according to the conventional technique.

In the above-described embodiment, the example in which the commands for which the execution order is set are mainly the movement commands has been described, but the execution order setting function of the present invention can also be applied to commands other than the movement command. FIG. 10 is a schematic function block diagram showing a main part of a numerical controller according to a second embodiment of the present invention. Each of the function blocks shown in FIG. 10 is realized by the CPU 11 included in the numerical controller 1 shown in FIG. 1, the CPU 11 being configured to execute the system program of the execution order setting function and control the operation of each unit of the numerical controller 1. The numerical controller 1 of the present embodiment includes the command analysis unit 100, the command executor 120, the interpolation unit 122, the servo controller 124, and a measuring unit 126. In the numerical controller 1 of the present embodiment, the command analysis unit 100 and the command executor 120 are provided for each path, the interpolation unit 122 is provided for each path that processes the movement command, the measuring unit 126 is provided for each path that handles a measuring device (not shown), and the servo controller 124 is provided for each servomotor 50 that drives an axis to be controlled. Other configurations are the same as the configurations of the first embodiment.

In the numerical controller 1 according to the present embodiment thus configured, as in the first embodiment, each command analysis unit 100 interprets the command block, included in the NC program read from the NC program storage area 200, creates command data to which the execution order is added in accordance with the order setting command. When executing the command data to which the execution order is added, each command executor 120 operates to pass the command data to the interpolation unit 122 or the measuring unit 126 so as to keep the set execution order. Such operation of each function unit makes it possible to easily control the execution order even in a case where movement control, and a different process such as measurement control are combined, for example, a value of the measuring device is acquired after the movement of the tool is completed.

Although the embodiments of the present invention have been described above, the present invention is not limited only to the examples of the above-described embodiments, and can be implemented in various modes with appropriate changes.

For example, in the above-described embodiments, adding the order setting command "M100P3" to the NC program or adding the order setting command "//–>" to the NC program makes it possible to set the execution order. However, any character string may be used as the order setting command within the range of the specification of the NC program as long as the character string can be distinguished from other commands. Furthermore, as for the label indicating the execution order, character strings other than J1, J2, J3, and so on may be used. Moreover, in a case where a label based on which a plurality of sets of commands can be distinguished from each other and a predetermined order of each of the sets of commands can be identified is used, any character string may be used within the range of the specification of the NC program as long as the character string can be distinguished from other commands or the like.

Furthermore, in the above-described embodiments, the example in which the execution order is set with respect to the start timing of a plurality of commands. However, an order relation in which when the previous execution order command is completed, the next execution order command is started may be set. Furthermore, a configuration may be employed in which the method of setting such an order relation and the setting of the execution order with respect to the start timing of a plurality of commands are selectively used with a different command or symbol.

Moreover, in the above-described embodiments, the example in which a plurality of paths are controlled with respective programs and the example in which the plurality of paths are controlled with one program have been described, but it is also possible to classify the plurality of paths into groups (each group includes one or more paths) and control the groups with respective programs. Even in such a case, using the order setting command as appropriate makes it possible to control the execution order of each command.

Although the embodiments of the present invention have been described above, the present invention is not limited to the examples of the above-described embodiments, and can be implemented in other modes with appropriate changes.

The invention claimed is:

1. A numerical controller that executes at least one NC program to control a plurality of paths of a machining device, the NC program including an order setting command by which an execution order between queuing commands of different paths of the NC program can be set for controlling each of the plurality of paths of the machining device in parallel, the numerical controller comprising:
 a processor configured to:
 read and interpret a command included in the NC program, wherein when the execution order of the command is set between the queuing commands for the different paths by the order setting command, the processor creates and outputs command data including the execution order, wherein the created command data includes movement command data to control an axis of the machining device of each of the plurality of paths; and execute command processing of each path of the plurality of paths in accordance with a check of a sequence of the execution order for each path of the plurality of paths and control execution of the command of a next block of the NC program based on the outputted command data in accordance with start and stop timing for the different paths to control the plurality of paths of the machining device in parallel without interruption of the NC program.

* * * * *